April 24, 1962

R. L. LANGERHANS 3,031,381

METHOD OF DRYING BACTERIA

Filed Jan. 29, 1960

PERCENT MOISTURE VERSUS TIME FOR DRYING.

INVENTOR
Robert L. Langerhans

BY

ATTORNEY 3,031,381
METHOD OF DRYING BACTERIA
Robert L. Langerhans, 5242 E. Riner Road,
Grand Island, N.Y.
Filed Jan. 29, 1960, Ser. No. 5,571
10 Claims. (Cl. 195—96)
(Granted under Title 35, U.S. Code (1952), sec. 266)

The invention described herein may be manufactured and used by or for the Government of the United States of America for governmental purposes without the payment to me of any royalty thereon.

This invention relates to a new method for drying of bacteria in order that the bacteria may be preserved.

It is extremely important that the temperatures employed in such drying processes be as low as economically possible in order to minimize the death rate of the bacteria.

It is the object of my invention to reveal a simple dependable process which allows preservation of bacteria by drying at near room temperature and requires only the use of dry gas at essentially atmospheric pressure.

Figure 1:
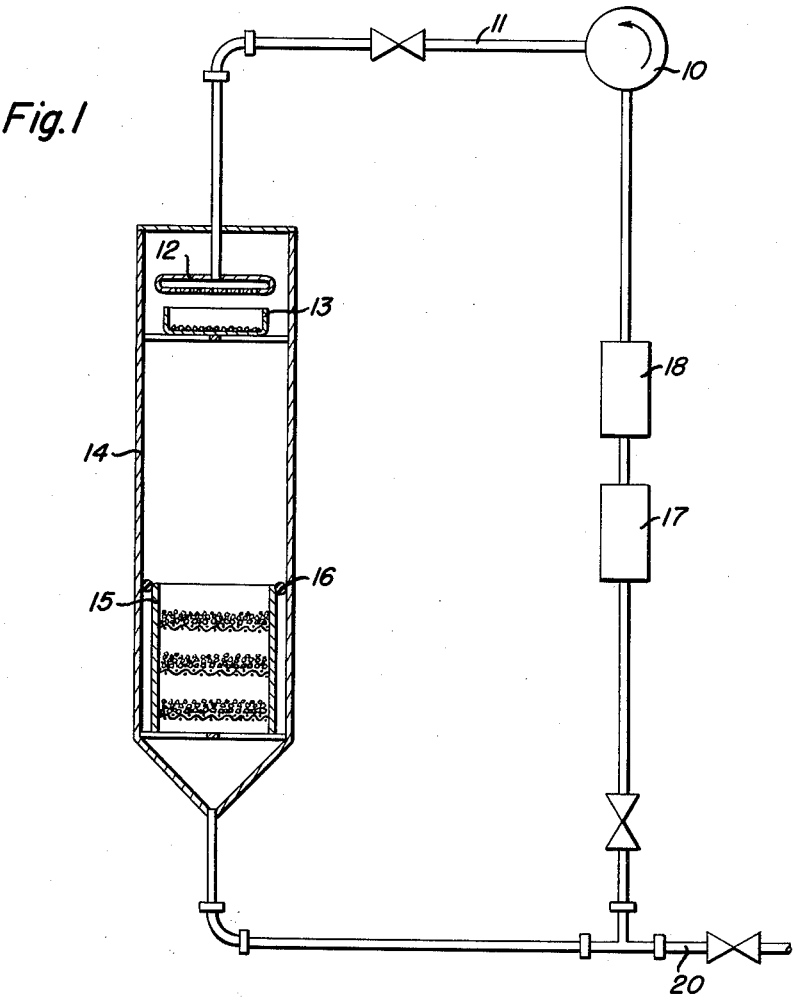
FIG. 1 shows a schematic drawing of the equipment used in my new process.

Referring to the drawing, the blower 10 sends dry gas through pipe conduit 11 to the flow plate distributor 12 where the gas is evenly distributed over the drying plate 13 containing the bacteria. Both the distributor plate and the drying plate are contained in the upper end of an elongated container 14. The adsorption bed container 15 is situated at the lower end of the container 14. A gasket 16 seals off the space between container 14 and adsorption bed container 15. The gas is passed over the bacetria in order to pick up moisture then it is sent through the adsorption bed to release the moisture, and finally the dry gas is recirculated through the humidity probe 17 and heater 18 back to the blower 10 to complete the cycle. The humidity probe constantly checks tht amount of moisture in the gas after it has passed through the adsorbent bed in order to determine when the adsorbent bed needs to be reactivated. The heater is used to keep the gas at a constant temperature, and it can also be used to heat the gas to 300° or more in order to reactivate the adsorbent bed. Exit line 20 is used to carry off the moist hot air obtained from reactivation of the bed. I have found that the gas, preferably air or nitrogen, must have a dew point in the range of −80° F. or below, in order to dry the bacteria sufficiently. By using a low dewpoint gas in this range, the drying operation is made feasible at atmospheric pressures and at temperatures of no more than 30° C.

In actual operation, the dry gas is passed over the bacteria which contain a considerable percentage of moisture. Since the air is almost bone dry it has an affinity for the moisture contained in the bacteria, and actually absorbs the moisture from the bacteria and carries it off. The bacteria are thereby dried. The air which now contains a considerable percent of moisture is passed through a moisture adsorbent bed of silica gel, Activated Alumina, or the new zeolite molecular sieves which are thoroughly described in Patents 2,882,243 and 2,882,244. Activated Alumina (registered trademark of Aluminum Ore Co.) is a granular adsorbent consisting essentially of aluminum trihydrate rendered highly porous and adsorbent. A typical composition of the commercial grade A material is $Al_2O_3$; $H_2O$ 7%; $Na_2O$ less than 1%; $SiO_2$ less than 0.1%; $Fe_2O_3$ less than 0.1%; and $T_1O_2$ less than 0.01%. Activated Alumina has the capacity to dry gases to at least −105° F. dewpoint. Silica gel has the capacity to dry air down to −90° F. dewpoint, and the new zeolite molecular sieve has the capacity to dry air to at least −100° F. dewpoint. The term "at least" is referring here and in the claims to absolute numbers.

The adsorbents when spent are reactivated by passing relatively dry air at from 300° to 600° F. through the bed. By relatively dry air, it is meant that the air should not contain more water than is contained in 80° F. air at full saturation. After reactivation, the adsorbents can again be used to dry the air or nitrogen which in turn dries the bacteria.

Several runs were made using the equipment that was previously described to determine a relationship between the variables. In these runs, frozen Serratia marcescens pellets stored at Dry-Ice temperatures were melted at room temperatures, and a known volume of the liquid Serratia marcescens to be dried was weighed into a Petri dish. The dish was then placed inside the container 14 below the air inlet at the top of the pipe. This formed the drying chamber. The sample was removed periodically and the rate of moisture loss was calculated. This procedure was followed throughout the various drying runs, with variations made in sample size, length of time allowed for drying, and the temperature of the drying. Flosdorf-Webster moisture determinations were made periodically and it was determined that the initial samples contained approximately 16.8% solids. An Aminco hygrometer, which measured the moisture content at the exit of the drying bed, showed that the moisture content of the air at this point was less than 1% relative humidity. The drying plates which were used to hold the sample during these experiments are slightly convex. As a result, the samples to be dried were of a non-uniform thickness. After drying, the Serratia marcescens near the center of the dish could be flaked readily by scratching with a knife; however, that portion of the sample near the edge of the dish, where the sample was thicker, was appreciably more gummy, and rather than flaking, it peeled from the Petri dish. Table I shows the results of these tests.

Table I. Summary of Runs

| Run | Grams Sample | Initial Moisture,ª Percent | Final Moisture, Percent | Time, Hours | Temperature, ° C. | Viable cell, Percent Recovery |
|---|---|---|---|---|---|---|
| 28 | 6.35 | 478 | 16.8 | 5.0 | 26 | 69.0 |
| 31 | 6.31 | 492 | 2.7 | 24.0 | 26 | 46.0 |
| 35 | 6.03 | 488 | 11.3 | 6.0 | 26 | 39.0 |
| 37 | 6.04 | 506 | 9.4 | 5.5 | 26 | 71.5 |
| 42 | 3.00 | 507 | 4.7 | 17.5 | 26 | 93.5 |
| 44 | 5.98 | 497 | 3.9 | 18.0 | 38 | 34.0 |
| 46 | 5.94 | 494 | 11.5 | 6.0 | 38 | 40.0 |
| 47 | 6.31 | 496 | 6.2 | 70.0 | 26 | 50.0 |
| 48 | 3.07 | 495 | 2.3 | 70.0 | 26 | 81.0 |
| 50 | 1.55 | 495 | 3.0 | 20.0 | 26 | 94.5 |
| 53 | 11.93 | 495 | 5.5 | 23.0 | 26 | 84.5 |
| 54 | 6.09 | 495 | <9 | 51.0 | 26 | 85.5 |

ª Based on dry solids content.

Starting with run 28, viable cell recovery data were obtained on the samples which were dried. These recoveries varied from a low of 34% in run 44 to a high of 94.5% in run 50.

In run 47 the moisture content was 11.8% after drying in the recirculated gas drying apparatus for 16 hours. The sample was then placed in a vacuum desiccator for an additional 54 hours, with molecular sieves as the desiccant. The final moisture content of the sample was 6.2% and the total time for the run about 70 hours. The low recovery obtained in run 47 was probably not caused by the length of the run, since run 48 was of a similar length and the recovery was 81.2%. It is possible that the higher moisture content of the final product in run 47 may be the reason for the low recovery. This indicates a better storage stability at lower moisture content.

Figure 2:
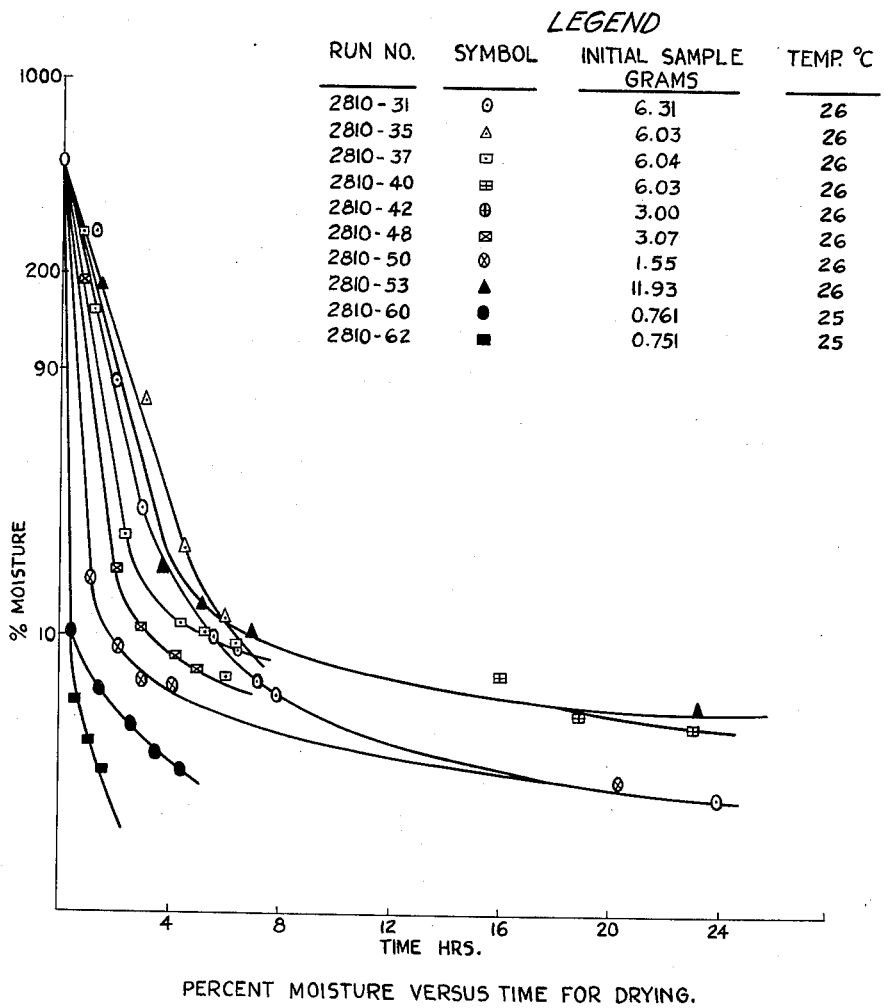
FIG. 2 shows by a graph the discovered relationships between the percent moisture and the drying time.

The lower viable cell recoveries in runs 44 and 46 were probably caused by the higher drying temperature of 38° C. The reasons for the low viable cell recoveries in runs 31 and 35 are not obvious. There is an indication that with a smaller sample and a thinner layer of material, the lower moisture content is reached more quickly, resulting in a higher viable cell recovery. FIG. 2 shows a plot of a number of runs in which the percent of moisture is plotted against the time for drying. It is apparent from this graph that the smallest and thinnest samples dried at a faster rate than the larger, thicker samples.

The data shown in FIG. 2 can be divided rather sharply into two drying periods. These periods are termed in drying practice, the constant-rate period and the falling-rate period of drying. The constant-rate period extends to moisture ranges of around 9%, and the falling-rate period begins at about 9% and continues to the lower moisture ranges. An improvement in the drying rate has been found by bypassing the adsorption bed with part of the re-circulating air, thus keeping the drying air at a higher relative humidity during the initial drying stages. Then, as the sample dries, the relative humidity of the drying air is gradually reduced until finally the entire drying stream is passed through the bed on each re-circulation. This procedure is very beneficial in reducing case-hardening complications.

The effect of temperature is somewhat dependent upon the sensitivity of the specific bacteria to heat. Some increased drying rate may be possible without loss of viability, with drying temperatures in the range of 30° to 35° C.

It appears that an acceptable method of obtaining a thin layer of material to be dried would be to spread the material on a rotating drum. The product could be scraped from the rotating drum with a standard doctor knife after the required moisture content is reached. It should be pointed out that in the experiments reported here it was necessary to use *Serratia marcescens* pellets which were available and which were optimum for freeze drying operations; that is, they contained approximately 500% moisture based on the weight of the dried solids. There is no reason to assume that this percent moisture is optimum for such a proposed drying process. Perhaps it would be more satisfactory if the initial *Serratia marcescens* to be dried were approximately 75% of the weight and the rest being removable water.

In this series of tests an air re-circulation rate of 7 cubic feet per minute was used with an average air velocity over the face of the sample of about 50 feet per minute. No attempt was made to vary the air flow nor to evaluate the effect of variation of the air flow on the quality and quantity of dried product. This will also require further consideration.

The process of drying bacteria by the employment of bone dry gases in order to preserve the bacteria is completely new in the art. This drying process holds forth an economically feasible process heretofore unknown. It is now possible to preserve bacteria for many years by using this new method.

I claim:
1. A method of drying bacteria which comprises the steps of passing a gas having a dewpoint less than −80° F. over the bacteria to be dried, and then passing said gas now containing moisture through a moisture adsorbent bed which is capable of drying said gas to at least a −80° F. dewpoint, and recirculating said gas now dried back to said bacteria to complete the cycle.
2. The method of claim 1 wherein the temperature of the gas is determined by the heat sensitivity of the bacteria to be dried.
3. The method of claim 1 wherein the adsorbent bed consists of zeolite molecular sieves.
4. The method of claim 1 wherein the adsorbent bed consists of silica gel.
5. The method of claim 1 wherein the adsorbent bed consists of highly porous and adsorbent aluminum trihydrate.
6. A method of drying bacteria that prevents case hardening of the bacteria sample, which comprises the steps of passing a dry gas over the bacteria to be dried, and then proportionately splitting the resulting moisture laden gas flow into two streams, a first stream of gas being passed through a moisture sorbent bed which is capable of drying said gas to at least −80° F. dewpoint and then recirculating the first stream of now moisture-free gas back to said bacteria, the second stream of moisture laden gas being admixed and passed with the first stream of moisture-free gas back to said bacteria, and gradually decreasing the amount of the moisture laden gas in the gas mixture as the drying of the bacteria proceeds to completion, so that by the time the bacteria sample is dried there no longer will be moisture laden gas being recycled to the bacteria.
7. A method of claim 6 wherein the temperature of the gas is determined by the heat sensitivity of the bacteria to be dried.
8. The method of claim 6 wherein the adsorbent bed consists of zeolite molecular sieves.
9. The method of claim 6 wherein the adsorbent bed consists of silica gel.
10. The method of claim 6 wherein the adsorbent bed consists of highly porous and adsorbent aluminum trihydrate.

References Cited in the file of this patent

UNITED STATES PATENTS

| | | |
|---|---|---|
| 1,694,807 | Brown | Dec. 11, 1928 |
| 2,535,902 | Dailey | Dec. 26, 1950 |
| 2,783,547 | Bieger | Mar. 5, 1957 |
| 2,910,139 | Matyear | Oct. 27, 1959 |